United States Patent
Kuwahara (10) Patent No.: US 6,621,597 B1
(45) Date of Patent: Sep. 16, 2003

(54) DIGITAL PROCESSING APPARATUS

(75) Inventor: Tetsuya Kuwahara, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 09/356,244

(22) Filed: Jul. 16, 1999

(30) Foreign Application Priority Data

Jul. 23, 1999 (JP) .......................................... 10-207350

(51) Int. Cl.$^7$ ........................... H04N 1/40; H04N 1/32
(52) U.S. Cl. ..................................... 358/448; 358/468
(58) Field of Search ................................ 758/443, 448, 758/403, 1.12, 468, 496

(56) References Cited

FOREIGN PATENT DOCUMENTS

| JP | 356142549 A | * 11/1981 | .......... G03G/15/00 |
| JP | 02-137865 | * 5/1990 | .......... G03G/15/00 |
| JP | 03-270559 | 12/1991 | |
| JP | 04-250761 | * 7/1992 | ............ G09G/5/36 |
| JP | 09-200392 | * 7/1997 | .......... G03G/21/00 |
| JP | 09-294194 | * 11/1997 | ............ H04N/1/21 |
| JP | 10-083314 | * 3/1998 | ............ H04N/1/00 |
| JP | 10-178510 | * 6/1998 | .......... G03G/21/00 |
| JP | 10-327283 | * 12/1998 | ............ H04N/1/00 |
| JP | 11-220558 | 8/1999 | |

* cited by examiner

Primary Examiner—Jerome Grant, II
(74) Attorney, Agent, or Firm—Hogan & Hartson, LLP (57) ABSTRACT

When a processing unit is directed by an operating unit to process an additional function or change the current processing conditions, it performs the additional function or changes the processing conditions according to instructions without interrupting the job currently being performed. For example, when instructions for performing copying are received while facsimile transmission is being carried out, the image for transmission stored in an image memory is transmitted, and the same image is printed out from an associated printing device. Likewise, while performing electronically sorted copying, the number of copies can be changed or the document being copied can be transmitted via facsimile. Also, an additional document can be sent to the recipient of a current facsimile transmission, or an additional recipient of a document currently being transmitted can be specified without redialing or rescanning.

11 Claims, 7 Drawing Sheets

DIGITAL PROCESSING APPARATUS

BACKGROUND OF THE INVENTION

1. Field of the Invention

The present invention relates to a digital processing apparatus wherein at least one function is executed by the processing means according to instructions from the operating means.

2. Description of the Related Art

Various digital processing apparatuses such as facsimile machines, digital photocopiers and digital multi-function machines (or hybrid machines) that integrate facsimile and digital copying functions have been developed. For example, the copying function in the digital copier or digital multi-function machine includes an electronic sorting option. Generally in such a case, a user inputs into the operating unit the number of copies to be made, and a document (a plurality of sheets of paper) loaded in an automatic document feeder (ADF) or on a book scanner is scanned-in and stored in a memory. After all the sheets of document have been stored in the memory, the scanned image of document is output on a copy paper in the amount of one page at a time. By repeating this action the specified number of times, the output (copy paper) is sorted into the specified number of copy sets.

When such electronically sorted copying is performed by a conventional device, the number of copies cannot be changed once the machine begins scanning or printing of a document even if a user desires to do so. Conventionally, to make more copies after the scanning or printing operation has begun, a user must wait until after all copies have been printed out. The user then specifies additional copies, and scanning of the document and printing of reproductions must be carried out once more. If a user wants to make fewer copies, he or she must stop the automatic electronically sorted copying operation, subtract the number of copies already made from the number of copies now desired, reset the number of copies to be made to the new number, and then restart the process of scanning and printing the document once again.

Similarly, when performing facsimile transmission in a conventional facsimile machine or multifunction digital facsimile/copying machine, a user may want to send the same information to different destinations. To do so, conventionally, the document must be reloaded, a new different destination specified, and scanning and transmission performed each time the document is to be transmitted to the new destination. Also, when sending a document to a destination to which a user desires to send another transmission, the user must redial the destination before sending the new transmission. Resending of, the same information to the same destination is required, for example, when the line is busy at the first transmission.

Additionally, in a conventional multifunction digital machine, when a user performing facsimile transmission desires to print out the document being sent, the user has no choice but to copy the document anew. And when a user performing electronically sorted copying wants to send the same data via facsimile transmission, he or she also has no choice but to perform sorted copying and transmission separately.

Thus, in a conventional digital processing apparatus, the processing conditions cannot be changed during execution of a job (either facsimile transmission or copying). In order to change operations, the function currently being performed must be temporarily halted, and a desired processing should be done from the beginning.

SUMMARY OF THE INVENTION

In order to solve these problems, it is an object of the present invention to provide a digital processing apparatus in which operations can be changed or altered even when there is a function currently being executed.

To accomplish this object, the present invention provides a digital processing apparatus including a processing means for executing one or more functions, and an operating means for specifying processing conditions to the processing means and instructing the processing means to execute a certain process under a particular condition, characterized in that the operating means is capable of specifying changed settings of an operation while a function is being executed by the processing means, and the processing means, upon specification of the changed settings from the operating means during execution of a function, continues to execute the function according to the changed settings.

For example, when the processing means is capable of executing an electronically sorted copying function for a specified number of copies, the operating means can, while the electronically sorted copying function is being executed by the processing means, specify a reduced number of copies. When the processing means, while executing the electronically sorted copying function, receives instructions reducing the number of copies, it resets the processing conditions to the reduced number of copies as instructed, and continues executing the electronically sorted copying function accordingly. Thus, when the number of copies is reduced, the need to halt the electronically sorted copying function and restart the process from the beginning is eliminated; only the new number of copies need be specified, and processing can continue uninterrupted.

When the processing means is capable of executing a facsimile communication function and a printing function from a memory, the operating means can, while the processing means is executing a facsimile communication function, specify changed settings, instructing the processing means to perform a printing function. Specifically, when the processing means, while executing the facsimile transmission function, receives the instructions to perform the printing function, either the data being transmitted or the data that has been transmitted can be printed out either while the facsimile transmission function is being performed or after the transmission function has been completed. Thus, an image to be transmitted can be printed out via a printer or the like while facsimile transmission is being performed. Unlike the conventional machines, the document need not be rescanned for printing.

When the processing means is capable of executing a facsimile transmission function and an electronically sorted copying function, the operating means can, while an electronically sorted copying function is being executed by the processing means, specify changed settings, instructing the processing means to perform a facsimile transmission function. When the processing means, while executing the electronically sorted copying function, receives instructions to perform the added facsimile transmission function, either while continuing to perform the electronically sorted copying function or after completing such function, it transmits via facsimile either data being copied or data that has been copied. Thus the document being copied can be transmitted via facsimile while the copying function is being performed, and the document need not be rescanned, as is the case in conventional devices.

When the processing means is capable of executing a facsimile transmission function, the operating means can, while a facsimile transmission function is being executed by the processing means, specify an additional document to be transmitted to the same recipient as the recipient of the current facsimile transmission, or can specify an additional recipient of the same data. When the processing means, while transmitting facsimile data to a certain recipient, receives instructions to transmit an additional document to the same recipient, the additional document is transmitted to the same recipient without disconnecting the line after transmission of the first document image is completed. Thus, the additional document can be sent continuously over the same connection without redialing the recipient. When the processing means receives instructions for transmission of the same data to a new recipient, the same data can be transmitted to the specified recipient after facsimile transmission to the first recipient is completed. Thus, when a user wants to send the same data to a different recipient, he or she can transmit the data without having to rescan the document.

Detailed Description of the Invention

Figure 1:
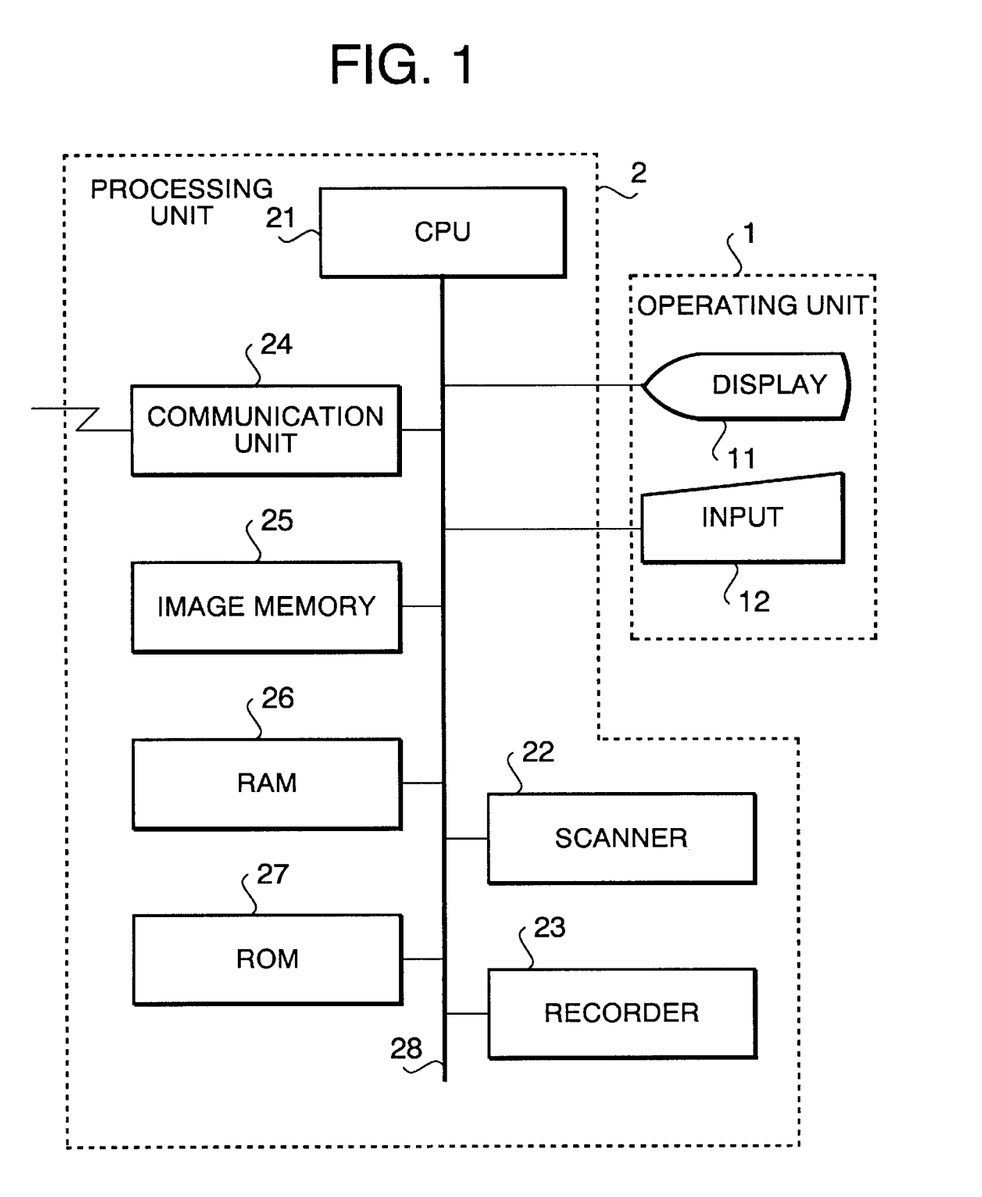
FIG. 1 illustrates a block diagram of a digital processing apparatus according to one embodiment of the present invention.

Referring to FIG. 1, illustrated is a block diagram showing a first embodiment of the digital processing apparatus of the present invention. In the diagram, reference numeral 1 is an operating unit (control panel), 2 is a processing unit, 11 is a display unit, 12 is an input unit, 21 is a CPU, 22 is a scanning unit, 23 is a recording unit (printer), 24 is a communication unit, 25 is an image memory, 26 is RAM, 27 is ROM, and 28 is a BUS. The digital processing apparatus of the present invention is capable of performing a variety of functions; for purposes of the explanation provided herein, the main functions of the apparatus are facsimile transmission and reception, and copying. The copy function includes electronically sorted copying capability.

The operating unit 1 includes a display unit 11 and an input unit 12. The display unit 11 displays various information to the user, including general messages for the user, the status of the apparatus, operational guidance, and the like. The input unit 12 is used by the user for the input of data when the user wants to give the apparatus various instructions. Thus, using the display unit 11 and the input unit 12, the user can set the various functions of the machine.

Figure 2:
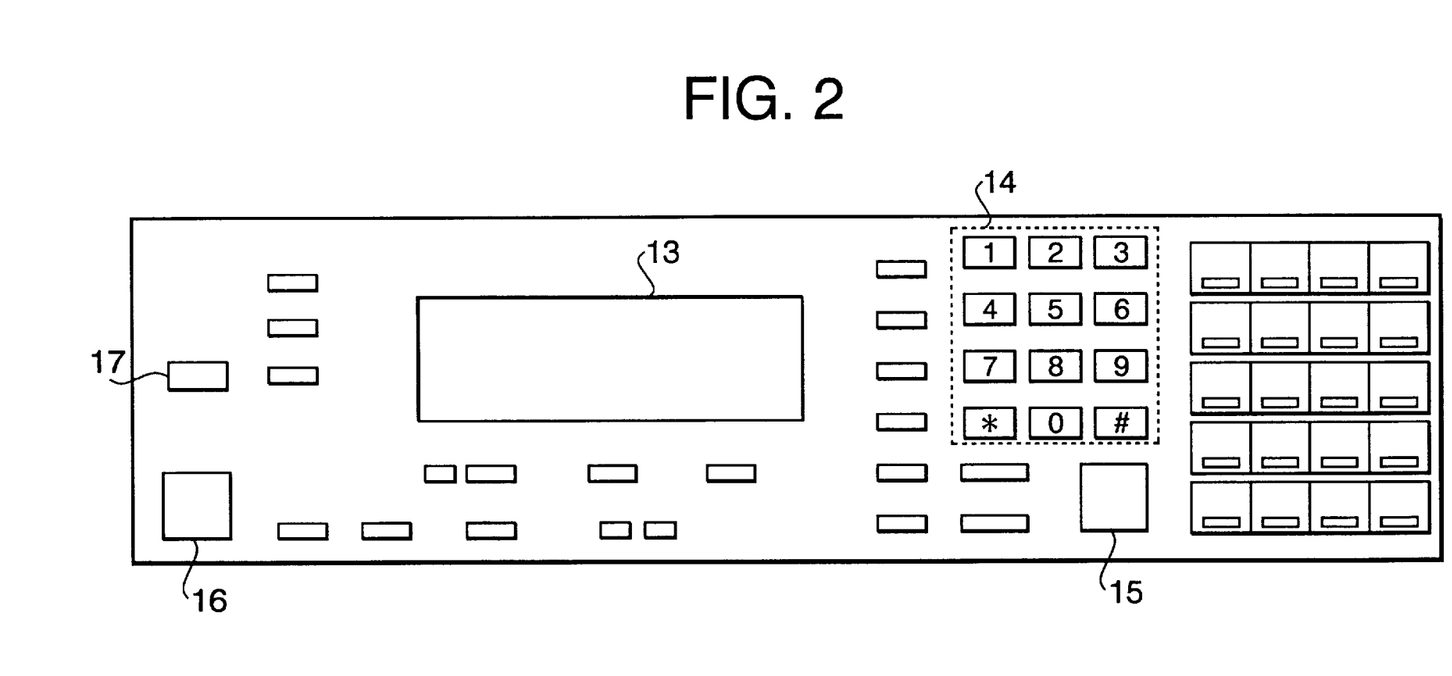
FIG. 2 is an explanatory diagram of an operating panel of an operating unit shown in FIG. 1.

Referring to FIG. 2, illustrated is an explanatory diagram showing an example of an operating panel of operating unit 1. Reference numeral 13 designates an LCD, 14 a number pad, 15 a start key, 16 a function switching key, and 17 a job changing key. In the illustrated embodiment, the LCD 13 is part of the display unit 11. It should be noted that in addition to the LCD 13, the display unit 11 includes an LED light-up display. The input unit 12 is comprised of the number pad 14, start key 15, function switching key 16, job changing key 17, and various other function keys. A touch-screen may be provided on the LCD 13 such that input can be performed through the LCD 13 display. The number pad 14 allows recipient telephone numbers to be input for facsimile transmission, and also allows the number of copies to be input when copying is performed. The start key 15 initiates the various functions of the apparatus. The function switching key 16 is used when switching between the functions which the machine is capable of executing, such as facsimile transmission and copying functions.

The present invention allows for additional functions to be specified and processing conditions to be changed while a particular function is currently being executed. The job changing key 17 is used for such tasks. When the job changing key 17 is pressed, specification of additional functions or change of operating conditions for the function currently being executed can be input into the machine.

As shown in FIG. 2, the function keys are not limited to mechanical push-buttons, keys, and switches; a variety of input methods may be adopted, including electronic switches such as touch-panels arranged on the LCD 13, virtual buttons displayed on a monitor and activated by a point-click type device, and the like.

Returning to FIG. 1, the processing unit 2 executes the various functions of the digital processing apparatus. When performing facsimile transmission, for example, image data is scanned-in from a document by the scanning unit 22, and transmitted by the communication unit 24. When performing facsimile reception, an image received at the communication unit 24 is reproduced on a recording medium (recording sheet) by the printer unit 23. While performing the facsimile transmission or reception function, an image to be transmitted or an image that is received may be temporarily stored in the image memory 25.

When copying is performed, an image of a document scanned-in by the scanning unit 22 is reproduced on a recording medium by the recording unit 23. Particularly when performing electronically sorted copying, which is one of the copying functions, a scanned image is temporarily stored in the image memory 25, and images are formed on the recording medium by the recording unit 23 such that the set is printed out one page at a time, either from last to first or first to last enough times to make the specified number of copies.

When, during the execution of a particular function, the processing unit 2 receives from the operating unit 1 instructions for an additional function to be performed or instructions changing the processing conditions, the additional function is executed according to the instructions or the processing conditions are changed without interrupting the function currently being executed. For example, when a request to transmit an additional document is received while facsimile transmission is being carried out, the telephone line connection with the recipient will be maintained after transmission of the first scanned document, and an image of the additional document will be transmitted subsequently. When an additional recipient is specified during facsimile transmission, the same data is transmitted to the additional recipient after transmission to the first recipient is completed. If copying is requested during facsimile transmission, the data being transmitted by facsimile can be output from the recording unit 23. Even when electronically sorted copying is being performed, the number of copies can be changed, or data being copied can also be transmitted via facsimile.

Execution of such operations will now be explained in detail.

In the present embodiment, the processing unit 2 includes CPU 21, scanning unit 22, recording unit 23, communication unit 24, image memory 25, RAM 26, ROM 27, and the like. These elements are all interconnected via BUS 28. The operating unit 1 is also connected to BUS 28. BUS 28 allows for the transmission of data between the various elements. It should be noted that in addition to the aforementioned elements an external memory device as well as various other elements may also be connected over BUS 28.

CPU 21 controls the entire apparatus and operates the each of the elements. In particular, CPU 21 controls the processing unit 2 such that the processing unit 2 executes various functions including facsimile transmission and reception, and copying functions. Furthermore, CPU 21 also controls the processing unit 2 such that the processing unit 2 can allow for additional functions to be requested or for processing conditions to be changed while a function is being performed.

The scanning unit 22 scans-in an image of a document that will be either transmitted via facsimile or copied. The scanning unit 22 may be an image input device such as an image scanner. The recording unit 23 forms onto recording media images received via facsimile reception, images obtained via the scanning unit 22, messages from other devices, and the like. The recording unit 23 may employ any of suitable recording methods including electrophotographic, ink-jet, or thermal printing methods.

The communication unit 24 includes an NCU, modem and the like, and is used to perform facsimile communication over a telephone line.

The image memory 25 stores images to be transmitted via facsimile, images received via facsimile communication, images scanned-in from the scanning unit 22, images to be printed by the recording unit 23, and images undergoing other processing. In this particular embodiment, the image memory 25 is designed not to erase the object image before and during facsimile transmission or reception, or during copying using the image memory 25.

RAM 26 is used for purposes such as storing data when processing is performed by the CPU 21 or other elements. ROM 27 stores programs and permanent data which regulate the operation of the CPU 21.

An example of the operation of the digital processing apparatus of the present invention (first embodiment) will now be described.

Figure 3:
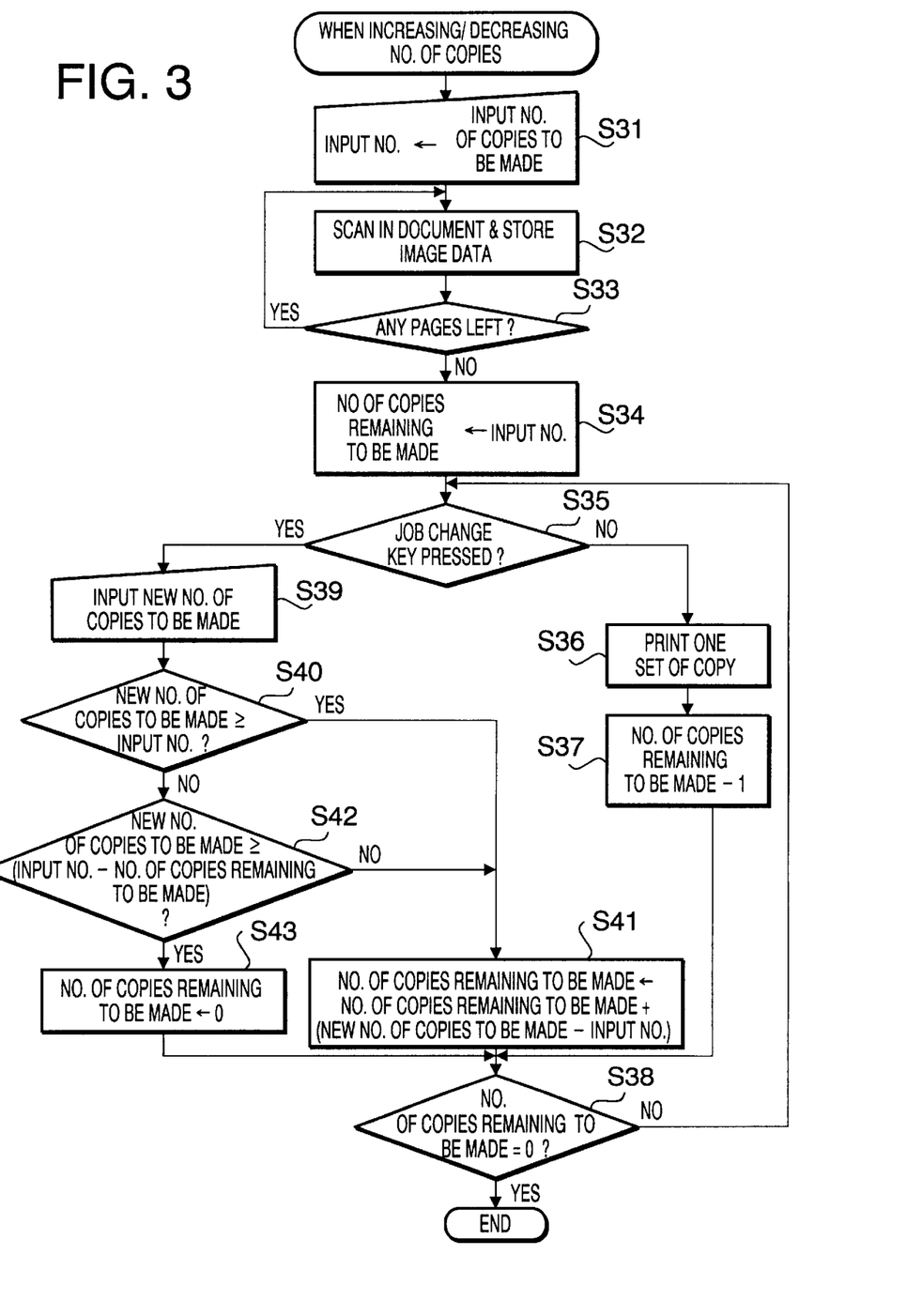
FIG. 3 is a flow chart showing an example of a first operation in the digital processing apparatus shown in FIG. 1.

Referring to FIG. 3, illustrated is a flow chart showing the first exemplary operation. This example deals with a case where the number of copies is changed while an electronically sorted copying function is being performed.

At step S31, the user first inputs the number of copies to be made into the operating unit 1. At step S32, an image of a document (first sheet or page of original paper) to be copied is scanned by the scanning unit 22 and stored in the image memory 25. At step S33 it is determined whether or not there are any sheets of document remaining to be copied, and if so, the program returns to step S32. Thus, step S32 is repeated until all the pages of the document to be copied are scanned-in and stored in the image memory 25.

When the entire document to be copied has been scanned-in, the number of copies to be made that has been input is stored as a counter for the number of copies remaining at step S34, and the program proceeds to the recording operation whereby images of all scanned pages of document are printed out. First, at step S35, it is determined whether or not the job change key on the control panel 1 has been pressed. As previously described, the job change key is used by the operator to add an additional function or to change the processing conditions for a function that is currently being executed. If the job change key has not been pressed (NO at step S35), then normal electronically sorted copying continues. In other words, at step S36, the document images stored in the image memory 25 are transferred to the recording unit 23, which forms the image onto the recording medium. All the pages of the scanned document are sequentially printed out, and one set of copy is output. The counter for the number of copies remaining to be made is then decreased by 1 at step S37. At step S38 it is determined if the counter has reached 0, and if not, the program returns to step S35 to output the next set of copy. If the counter has reached 0, then the electronically sorted copying function terminates.

When a change in the number of copies is made during execution of such an electronically sorted copying function (e.g., when the user notices that he or she has incorrectly entered the number of copies, or when the user is told to make additional sets of copy after copying has begun), the user presses the job change key at the operating unit 1, and inputs the new number of copies to be made by the electronically sorted copying function currently being executed. When the job change key is pressed, the program moves from step S35 to step S39. At step S39, the changed number of copies is input from the operating unit 1. At step S40, it is determined whether or not the changed number of copies is equal to or greater than the number of copies first input at step S31. If the new number of copies is greater than the original number of copies, then the number of copies are increased at step S41. In other words, the difference between the new number of copies and the number of copies originally input is added to the counter for the remaining number of copies to be processed, and a new remaining number of copies derived. After step S41, steps S36 and S37 are repeated according to the updated remaining number of copies, resulting in a total number of copies equal to the updated number specified by the user.

If the changed number of copies is smaller than the originally input number of copies, it may be possible that the changed number of copies have already been printed. Thus, at step S42, the number of copies remaining is subtracted from the number of copies originally input in order to calculate the number of copies that have already been made. If the number of copies that have already been made is equal to or exceeds the changed number of copies, then enough or more than enough copies have been output, so the remaining number of copies to be made is set to 0 at step S43 and the copy function terminates. If, on the other hand, the number of copies that have already been made is less the newly input number of copies, then the number of copies originally input is subtracted from the changed number of copies, and this difference is added to the number of copies remaining to be made at step S41, in order to determine a new number of copies remaining to be made.

Thus, by pressing the job change key, a user can change the number of copies to be made in an electronically sorted copying function even while scanning is being performed by the scanning unit 22 or while printing being performed by the recording unit 23. For example, if the user originally instructs that five copies are to be made, but then finds that five more copies are needed while electronically sorted copying is being performed, the user can press the job change key and change the total number of copies to ten while a document is being scanned or printed. The machine will then make five additional copies, for a total of ten copies. Alternatively, if the user again originally instructs that five copies are to be made, but this time realizes that the user does not need five copies, the user can then press the job change key and change the total number of copies to, for instance, three. In this case, if the number of copies that have already been output is less than three, then printing out will stop after the three sets are made. Alternatively, if three or more copies have already been made, then printing function will terminate the moment the number of copies is changed.

Figure 4:
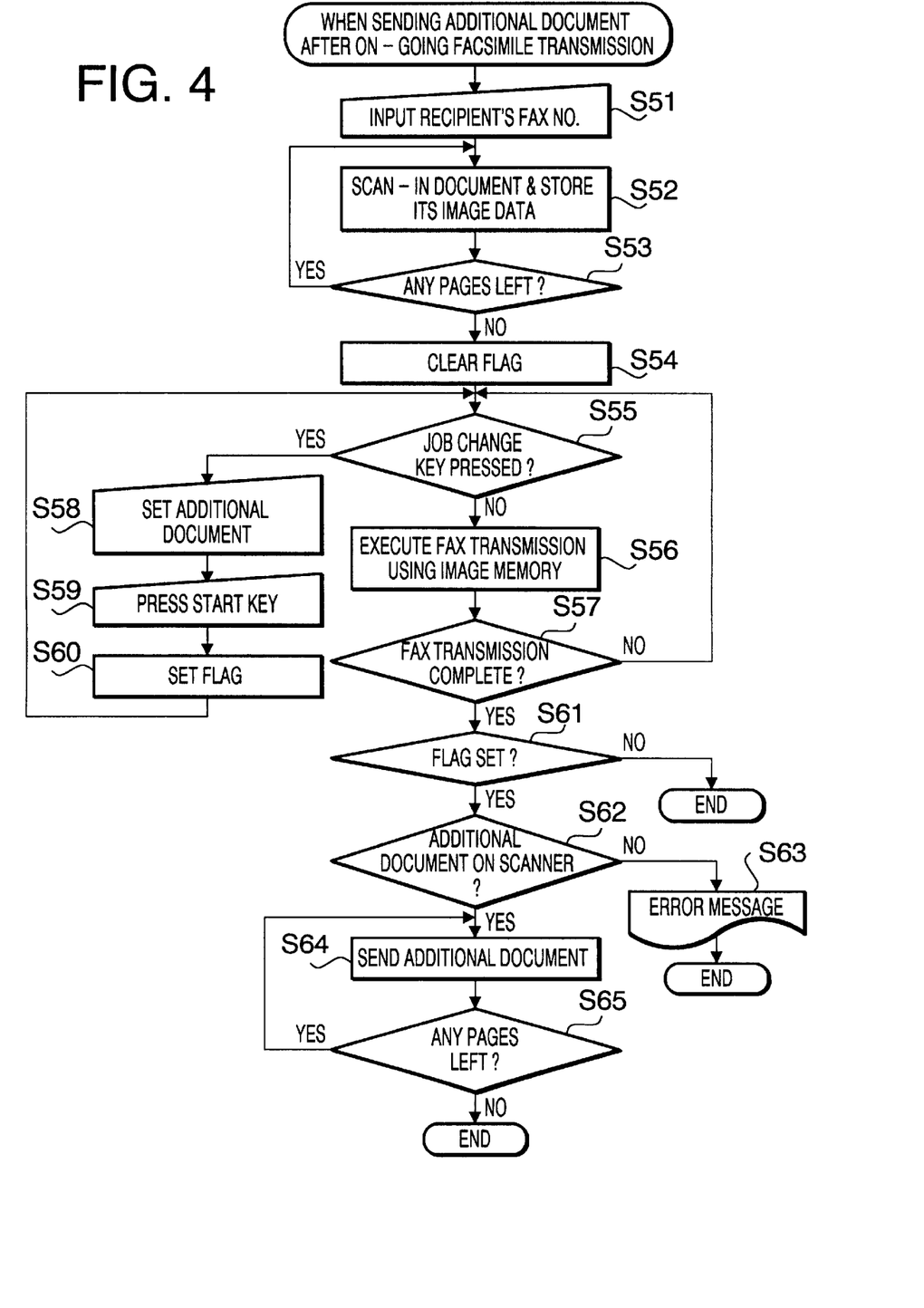
FIG. 4 is a flow chart showing an example of a second operation in the digital processing apparatus of the present invention.

FIG. 4 illustrates a flow chart showing an example of a second operation. In this operation, while facsimile transmission is being performed via the memory (scanned image data is first stored in the memory and then transmitted to a destination from the memory), another document is added for transmission to the same recipient.

At step S51, the user loads an original document to be transmitted to the recipient into the scanning unit 22, inputs the facsimile number of the recipient of the facsimile transmission, and then presses, for instance, the start key on the operating unit 1. Subsequently, at step S52, an image on the first sheet or page of the loaded document is scanned in by the scanning unit 22, and storing of the image in the image memory 25 begins. At step S53 it is determined whether or not any pages of the document to be transmitted remain; if so, the program returns to step S52. In this way step S52 is repeated until all the pages of the document to be transmitted are scanned-in and stored in the image memory 25.

Once scanning-in of the document to be transmitted is completed, the additional job processing flag (i.e., a flag indicating if additional document transmission is required in this particular embodiment) is cleared at step S54 and then the program advances to transmission of the scanned document. In the process of document transmission, it is first determined at step S55 whether or not the job change key on the control panel 1 has been pressed. If it has not, the document stored in the image memory 25 is transmitted to the recipient via the communication unit 24 at step S56. It is then determined at step S57 whether or not all of the document stored in the image memory 25 has been transmitted. If some part of the document remains, the program then returns to step S55. Thus the transmission procedure at step S56 continues until all of the document to be sent to the recipient, stored in the image memory 25, is transmitted.

A request may be made to send an additional document to the same recipient during transmission of the image stored in the image memory 25. In this case, the user presses the job change key on the operating unit 1, and programs the changed instructions for the facsimile transmission function currently being performed. When the job change key is pressed, the program moves from step S55 to step S58. At step S58 the additional document is loaded in the scanning unit 22, and at step S59 the user presses the start key. The processing unit 2 then raises an added job processing flag at step S60 indicating that there is an additional document to be sent. The second document loaded in the scanning unit 22 may then be scanned and stored in the image memory 25 at the same time facsimile transmission is being carried out, but in the present embodiment the document is scanned after transmission of the document stored in the image memory 25 has been completed.

At step S57 it is confirmed that transmission of the document stored in the image memory 25 has been completed. Next, at step S61 it is determined whether or not the additional job processing flag has been raised. As described above, the flag is raised when the job change key is pressed during transmission. If the job change key has not been pressed, then the flag is still in the cleared condition, and the facsimile transmission function is terminated.

If the job change key has been pressed and the "additional document" flag raised, the telephone line connection is maintained, and the additional document is transmitted. At step S62, it is determined whether or not a new document has been loaded in the scanning unit 22. If no document is loaded, then at step S63 an error message is output. The error message may be displayed on the display unit 11 of the operating unit 1 or may be printed out from the recording unit 23.

If there is a document loaded in the scanning unit 22, then at step S64 this document is scanned-in by the scanning unit 22 and transmitted via facsimile transmission by the communication unit 24. At step S65 it is determined whether or not all pages of the document have been completely transmitted; if not, then the program returns to step S64 and continues scanning and transmission. Thus the originally loaded document is first scanned and transmitted in its entirety, and then the additionally loaded document is transmitted in its entirety. After both the originally and, additionally loaded documents have been transmitted, the line is disconnected and the facsimile transmission procedure is terminated.

In this way, by pressing a job change key during facsimile transmission, an additional document can be scanned and transmitted after scanning and transmission of the document originally loaded in the scanning unit 22 without disconnecting the telephone line.

In the present embodiment, the document first loaded into the scanning unit 22 is completely scanned and transmitted before an additional document is scanned and transmitted, but the present invention should not be understood to be restricted to such an embodiment. For example, scanning of an additional document by the scanning unit 22, and storage of this document in the image memory 25 occurs immediately after step S59, i.e., immediately after the start key is pressed subsequent to pressing of the job change key. Further, it may be determined whether or not the current document has been completely transmitted after each page of the next document is scanned and stored. When transmission of the final page of the current document is detected, transmission of, the next document from the image memory 25 may immediately start.

Figure 5:
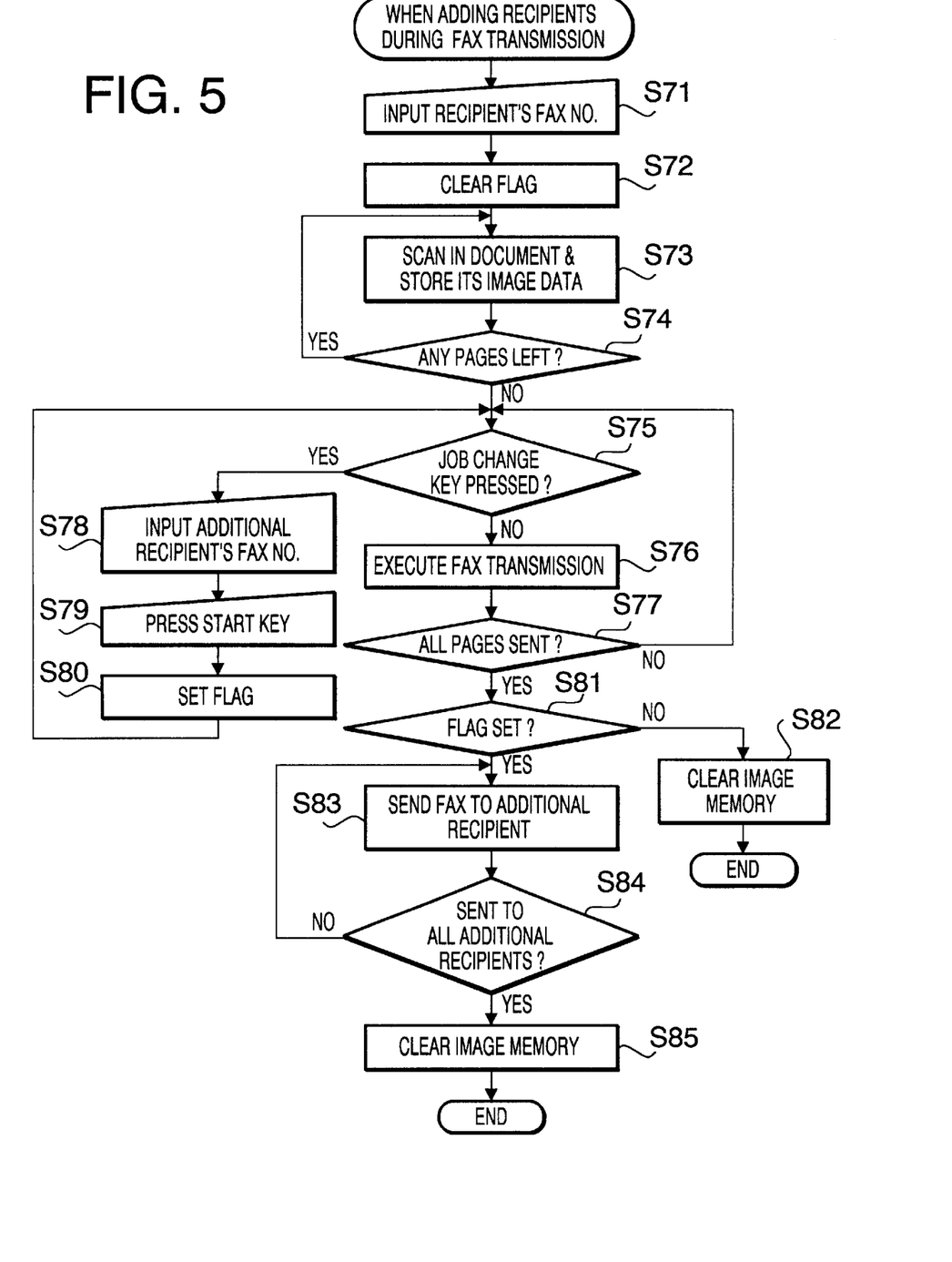
FIG. 5 is a flow chart showing an example of a third operation in the digital processing apparatus of the present invention.

FIG. 5 is a flow chart showing an example of a third operation according to the present invention. In the third operation, while facsimile transmission is being performed to a certain recipient using document data stored in the image memory, an additional recipient is specified for the document currently being transmitted.

At step S71, the user loads a document for transmission in the scanning unit 22, enters the fax number of the recipient to whom transmission will be made, and presses the start key on the operating unit 1. Immediately afterwards, at step S72, a flag indicating whether or not an additional recipient is specified is cleared. At step S73, the first page of the document loaded in the scanning unit 22 is scanned and stored in the image memory 25. At step S74 it is determined whether or all pages of the document have been completely transmitted, and if not, the program returns to step S73. In this way, step S73 is repeated until the document to be transmitted is completely scanned-in and stored in the image memory 25.

Once scanning of the document to be transmitted is completed, the program advances to transmission of the scanned document. First, at step S75, it is determined whether or not the job change key on the operating unit 1 has been pressed. If it has not, then at step S76, the document stored in the image memory 25 is transmitted to the recipient via the communication unit 24. At step S77 it is then determined whether the document stored in the image memory 25 has been completely transmitted. If not, then the program then returns to step S75. Thus the transmission procedure at step S76 continues until the document stored in the image memory 25 for transmission to the recipient has been completely transmitted.

A request may then be made to transmit the same document to a different recipient during transmission of the image stored in the image memory 25. In this case, the user presses the job change key on the operating unit 1 and programs the changed instructions for the facsimile transmission function currently being performed. When the job change key is pressed, the program moves from step S75 to step S78. At step S78 the fax number of the additional recipient is entered into the operating unit 1, and at step S79 the user presses the start key. The processing unit 2 then sets the "additional recipient" flag at step S80.

At step S77 it is confirmed that transmission of the document stored in the image memory 25 has been completed. Next, at step S81, it is determined whether or not the "additional recipient" flag has been raised. As described above, the flag is set when the job change key is pressed during transmission. If the job change key has not been pressed, the flag is in the cleared condition. Consequently, the document image in the image memory 25 is erased at step S82, and the facsimile transmission function is terminated.

If, however, the job change key has been pressed and the flag raised, the program proceeds to step S83 without erasing the document image in the image memory 25, and the same document is transmitted to the specified additional recipient. At step S84 it is determined whether or not transmission of the document to all of the additional recipients has been completed; if not, then the program returns to step S83 and continues transmission to the remaining recipient(s). Once the document has been transmitted to all the additional recipients, the document image is erased from the image memory 25 and the facsimile transmission procedure terminated.

In this way, by pressing a job change key during facsimile transmission, the same document currently being transmitted can be transmitted to a different recipient without having to scan-in the same document again even if transmission has already begun.

Figure 6:
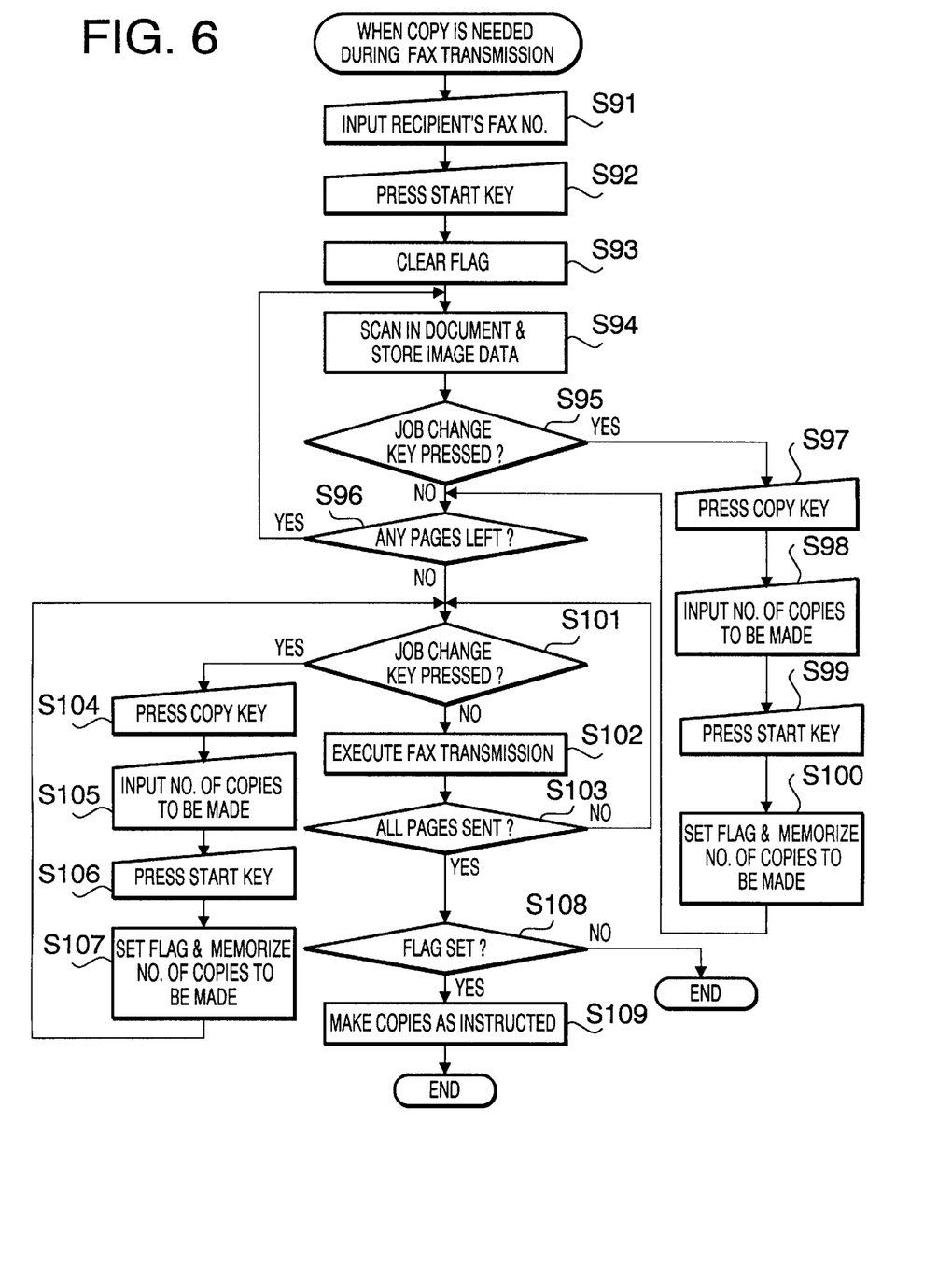
FIG. 6 is a flow chart showing an example of a fourth operation in the digital processing apparatus of the present invention.

FIG. 6 is a flow chart showing an example of a fourth operation according to the present invention. In this operation, while a facsimile transmission function is being performed, a user requests that the same data that is being transmitted via facsimile also be copied.

At step S91 the user loads a document to be transmitted into the scanning unit 22, enters the facsimile number of a recipient to whom the transmission will be sent, and at step S92, presses a start key on the operating unit 1. Immediately afterwards, at step S93, a flag used to indicate that a document currently being transmitted via facsimile is to be copied is cleared.

At step S94 the first page of the document is scanned-in by the scanning unit 22 and stored in the image memory 25. At step S96 it is determined whether or not any pages of the document have been left unscanned. If all pages of the document have not been scanned-in, the program returns to step S94. In this way step S94 is repeated until the document to be transmitted has been completely scanned-in and stored in the image memory 25.

In the illustrated example, while the document scanning process is being performed, it is determined at step S95 whether or not the job change key has been pressed. If the job change key is pressed while the document is being scanned, the program moves from step S95 to S97. At step S97 the user presses a copy key on the operating unit 1 in order to instruct the apparatus that the document currently being transmitted should be copied. Next, at step S98, the user enters the number of copies to be made, and at step S99 presses the start key. When the start key is pressed, the processing unit 2 sets the flag at step S100, and stores the number of copies in RAM 26.

Once scanning of the document to be transmitted by facsimile is completed, the scanned document is sent to a designated party at step S102. At step S103 it is determined whether or not the image of the document stored in the image memory 25 has been completely transmitted, and if not, the program returns to step S101. In this way step S102 is repeated until the document stored in the image memory 25 has been completely transmitted.

It is determined at step S101 whether or not the job change key has been pressed during the transmission procedure. A request for copying may been made during transmission by pressing the job change key. If the job change key is pressed, processing steps S104 to S107 is performed in the same manner as steps S97 to S100.

At step S103 it is confirmed that transmission of the document stored in the image memory 25 has been completed. Next, at step S108, it is determined whether or not the flag has been set. If the job change key has not been pressed, the facsimile transmission function is terminated.

On the other hand, if the job change key has been pressed and the flag thus set, then at step S109 the image of the document transmitted by facsimile, which has been stored in the image memory 25, is formed or reproduced onto a recording medium by the recording unit 23, thereby executing the copying function. The copy function may be executed by normal copying, or by electronically sorted copying.

In the present embodiment, if, while a document is being transmitted by the facsimile transmission function, a user requests that the same document be copied, then the copying function begins when the facsimile transmission function is completed. It should be noted, however, that it is also possible for the copying function to be executed simultaneously with the execution of the facsimile transmission function.

In this way, by pressing a job change key during scanning or transmission of a document, the transmitted document can also be copied either simultaneously or sequentially.

Figure 7:
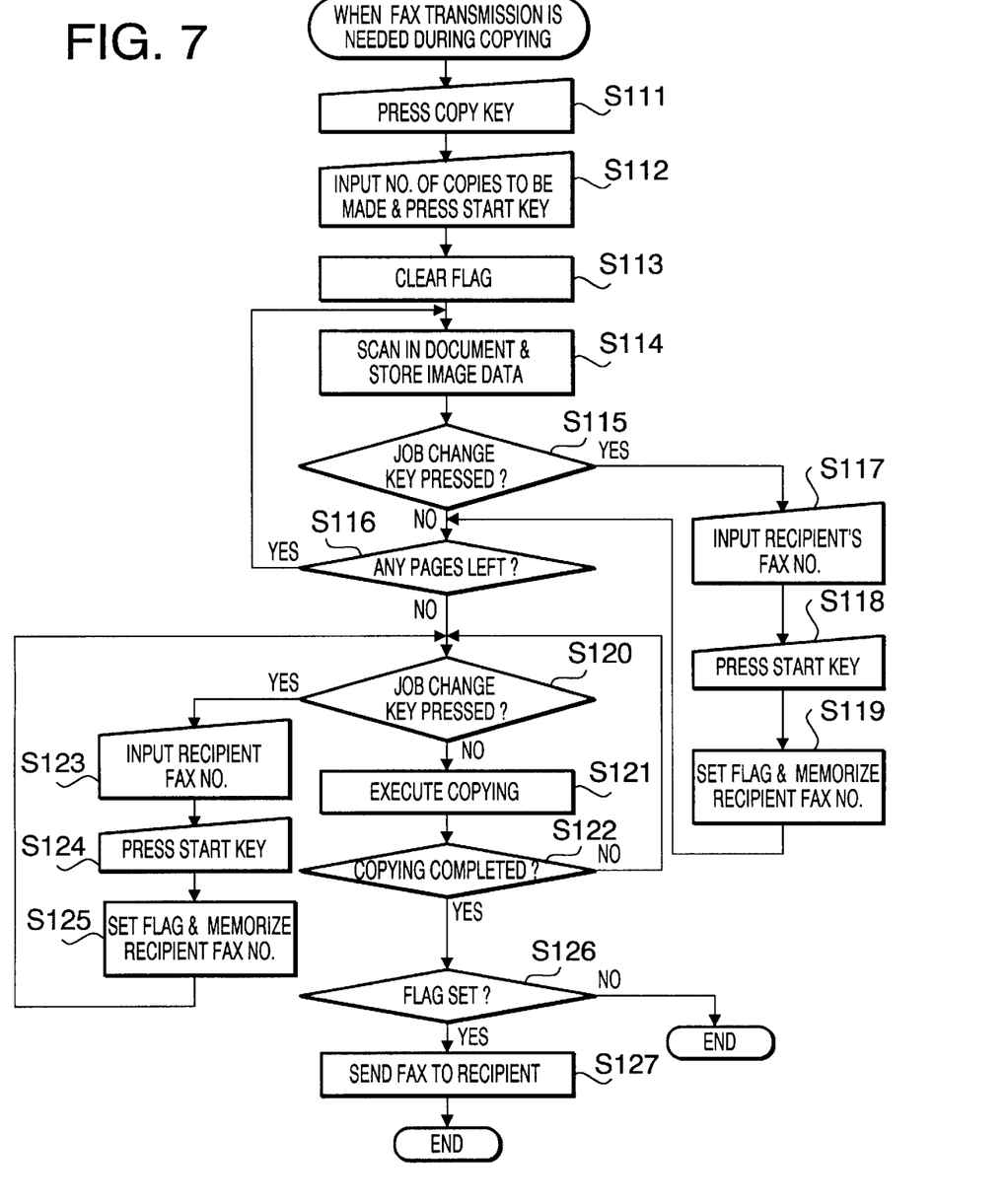
FIG. 7 is a flow chart showing an example of a fifth operation in the digital processing apparatus of the present invention.

FIG. 7 is a flow chart showing an example of a fifth operation carried out by the digital processing apparatus of the present invention. The fifth operation is the reverse of the fourth operation; while performing electronically sorted copying, the same document being copied is transmitted via facsimile.

At step S111 the user loads a document to be copied into the scanning unit 22 and presses a copy key on the operating unit 1. Next, at step S112, the user enters the number of copies to be made into the operating unit 1 and press a start key. Immediately afterwards, at step S113, a flag indicating that the document being copied should also be transmitted via facsimile is cleared.

At step S114 an image on the first page of the document is scanned by the scanning unit 22 and stored in the image memory 25. At step S116 it is determined whether all the pages of the document have been scanned-in, and if not, the program returns to step S114. In this way step S114 is repeated until the entire document is completely scanned and stored in the image memory 25.

At step S115 it is determined whether or not the job change key is pressed during the document scanning procedure. If the job change key is pressed during scanning then the program advances from step S115 to step 5117. At step S117 the user enters the fax number of the recipient into the operating unit 1 in order to instruct the apparatus to transmit via facsimile the document being copied. At step S118 the user presses a start key. When the start key is pressed, at step S119 the processing unit 2 sets the flag and stores the fax number of the recipient in RAM 26.

Once the scanning of the document is completed, recording of the image of the scanned document is performed onto a recording medium by the recording unit 23 at step S121. At step S122 it is then determined whether or not the document (image data) stored in the image memory has been output the specified number of times, and if not, the program returns to step S120. In.this way step S121 is repeated until the specified number of copies have been made.

At step S120 it is determined whether or not the job change key has been pressed, even if a transmission procedure is being performed. The job change key is pressed to request transmission via facsimile of a document that is currently being copied and printed out. If the job change key is pressed, processing at steps S123 to S125 continues in the same way as that at steps S117 to S119 is performed.

After confirming that the desired number of copies has been copied at step S122, it is determined at step S126 whether or not the flag has been set. If the job change key has not pressed, the copying function will terminate.

If, however, the job key has been pressed and the flag has accordingly been set, then at step S127 the stored fax number of the recipient is dialed by the communication unit 24 and the image of the copied document stored in the image memory 25 is transmitted via facsimile.

Thus, by pressing a job change key during scanning or printing out during execution of an electronically sorted copying function, the same document currently being copied can be transmitted via facsimile. In this embodiment, when facsimile transmission is requested during execution of an electronically sorted copying function, the facsimile transmission is performed after completion of the electronically sorted copying function, but it should be noted that the two functions can also be performed simultaneously.

These first through fifth operations described herein have showed how to change the processing conditions of what one supposes to be the main functions of the apparatus while either facsimile transmission or electronically sorted copying is performed. However, the present invention may also be employed for changing other functions and processing conditions. In the present invention, while performing a particular one of various functions provided in the digital processing apparatus, another function is executable or any of the various processing conditions of the function being performed may is changeable. Even in a digital processing apparatus provided only with facsimile communication capability, for example, the processing conditions may be changed during facsimile transmission as shown in the second and third examples of operation herein. Likewise, even in a digital processing apparatus provided only with copying functionality, the various copying conditions may be changed during electronically sorted copying as shown by the first operation herein. It should be noted that digital sorting and copying is but one example of a copying function using a memory, and that the present invention is not limited to the terminology used herein.

As has been made clear by the description above, in the present invention it is possible to request an additional function or change processing specifications while a particular function is being executed. The function currently being performed will continue according to the new instructions if the processing specifications are changed. Thus, for example, the number of copies may be changed during execution of a copy function using a memory, and facsimile transmission may be performed during execution of a copying function without having to rescan the document. Even during facsimile transmission, the same document being transmitted via facsimile can be copied without having to rescan the document.

The digital processing apparatus illustrated and described above is disclosed in Japanese Patent Application No. 10-207350 filed Jul. 23, 1998, and the subject application claims priority of this Japanese application, the entire disclosure of which is incorporated herein by reference.

What is claimed is:

1. A digital processing apparatus, comprising:

processing means for executing one or more functions; and operating means or specifying processing conditions and execution of processes for the processing means, and wherein the operating means is capable of specifying changed settings for the function currently being executed by the processing means, and when the processing means receives instructions of changed settings from the operating means during execution of a function, the processing means continues performing the function it is execut according to the changed settings, wherein the processing means is capable of executing a sorted copying function, the number of copies to be made being one of the processing conditions, the operating means is capable of specifying a reduced or increased number of copies to be made while the processing means is performing the sorted copying function, and when the processing means receives instructions of changed settings to reduce or increase the number of copies while performing the sorted copying, it continues to perform the sorted copying function according to the changed settings so as to make the reduced or increased number of copies.

2. The digital processing apparatus of claim 1, wherein the processing means is capable of executing a first facsimile transmission function by scanning an original document, storing its first image data in a memory, retrieving the first image data from the memory and sending the first image data to a designated recipient and a second facsimile transmission function by scanning another original document, storing its second image data in the memory, retrieving the second image data from the memory and sending the second image data to the recipient, the operating means is capable of specifying changed settings to additionally execute the second facsimile transmission function while the first facsimile transmission function is being executed by the processing means, and the processing means executes scanning of the another original document and storing of the second image data in the memory while the first facsimile transmission function is being executed if it receives instructions for second facsimile transmission during execution of the first facsimile transmission function, and executes retrieving of the second image data from the memory and sending thereof to the recipient upon completion of the first facsimile transmission function.

3. A digital processing apparatus, comprising:

processing means for executing one or more functions;

operating means for specifying processing conditions and execution of processes for the processing means, and wherein the operating means is capable of specifying changed settings for the function currently being executed by the processing means, and when the processing means receives instructions of changed settings from the operating means during execution of a function, the processing means continues performing the function it is executing according to the changed settings, wherein the processing means is capable of executing a printing function and a facsimile transmission function, the operating means is capable of additionally specifying a printing function while the facsimile transmission function is being executed, and when the processing means receives instructions of changed settings to additionally execute a printing function during execution of the facsimile transmission function, it either executes printing of the data which is currently being transmitted by the facsimile transmission function as it continues to perform the facsimile transmission function, or executes printing of the data transmitted by the facsimile transmission function after the facsimile transmission function has been completed.

4. The digital processing apparatus of claim 3, wherein the printing of data includes retrieving data from a memory and reproducing an original image based on the data.

5. The digital processing apparatus of claim 3, wherein the facsimile transmission function includes retrieving of data from a memory and sending of the data.

6. A digital processing apparatus, comprising:

processing means for executing one or more functions; and operating means for specifying processing conditions and execution of processes for the processing means, and wherein the operating means is capable of specifying changed settings for the function currently being executed by the processing means, and when the processing means receives instructions of changed settings from the operating means during execution of a function, the processing means continues performing the function it is executing according to the changed settings, wherein the processing means is capable of executing either a first facsimile transmission function by retrieving data from a memory or a second facsimile transmission function without retrieving data from the memory, the operating means is capable of specifying changed settings to additionally execute the second facsimile transmission function while the first facsimile transmission function is being executed by the processing means, and the processing means executes the second facsimile transmission function after completion of the first facsimile transmission function if it receives instructions for second facsimile transmission during execution of the first facsimile transmission function.

7. The digital processing apparatus of claim 6, wherein the second facsimile transmission without retrieving data from the memory is facsimile transmission carried out upon scanning of an original document.

8. A digital processing apparatus, comprising:

processing means for executing one or more functions; and operating means for specifying processing conditions and execution of processes for the processing means, and wherein the operating means is capable of specifying changed settings for the function currently being executed by the processing means, and when the processing means receives instructions of changed settings from the operating means during execution of a function, the processing means continues performing the function it is executing according to the changed settings, wherein the processing means is capable of executing a facsimile transmission function and a recipient adding function for adding an additional recipient, the operating means is capable of specifying changed settings to add an additional recipient while the processing means is executing the facsimile transmission function, and the processing means, upon receiving instructions to add an additional recipient while executing the facsimile transmission function, executes facsimile transmission to the additional recipient after completing facsimile transmission to a previous recipient.

9. The digital processing apparatus of claim 8, wherein the facsimile transmission function includes retrieving of data from a memory and sending of the data.

10. A digital processing apparatus comprising:

processing means for executing one or more functions; and operating means for specifying processing conditions and execution of processes for the processing means, and wherein the operating means is capable of specifying changed settings for the function currently being executed by the processing means, and when the processing means receives instructions of changed settings from the operating means during execution of a function, the processing means continues performing the function it is executing according to the changed settings, wherein the processing means is capable of executing a sorted copying function, the number of copies to be made being one of the processing conditions, and also capable of executing a facsimile transmission function, the operating means is capable of specifying changed settings to further execute a facsimile transmission function while the sorted copying function is being executed by the processing means, and the processing means, upon reception of instructions to further execute the facsimile transmission function during execution of the sorted copying function, either while performing the electronic copying and sorting function or after completing that function, executes the facsimile transmission function.

11. The digital processing apparatus of claim 10, wherein the facsimile transmission function includes retrieving of data from a memory and sending of the data.

* * * * *